United States Patent [19]

Peters

[11] Patent Number: 4,512,192
[45] Date of Patent: Apr. 23, 1985

[54] TWO AXIS ANGULAR RATE AND SPECIFIC FORCE SENSOR UTILIZING VIBRATING ACCELEROMETERS

[75] Inventor: Rex B. Peters, Woodinville, Wash.

[73] Assignee: Sundstrand Data Control, Inc., Redmond, Wash.

[21] Appl. No.: 528,772

[22] Filed: Sep. 2, 1983

[51] Int. Cl.³ ............... G01C 19/56; G01C 23/00; G01P 15/08
[52] U.S. Cl. .......................... 73/505; 73/510; 73/517 R
[58] Field of Search ............. 73/505, 510, 516 R, 73/517 B, 517 R

[56] References Cited

U.S. PATENT DOCUMENTS 3,744,322  7/1973  Pacey et al. ................ 73/505

Primary Examiner—James J. Gill
Attorney, Agent, or Firm—Michael B. McMurry; Ted E. Killingsworth; Harold A. Williamson

[57] ABSTRACT

An apparatus for inertially determining the rate of angular rotation and translational motion of a structure is provided which utilizes a pair of vibrating accelerometers vibrating along a single axis with their force sensing axis located normal to the axis of vibration and rotated 90° from each other. Signals from the vibrating accelerometers can be processed to provide indications of angular rotation about two axes and translation motion about two axes. Two of the sets of vibrating accelerometers can be combined to provide a three axis inertial reference system.

7 Claims, 3 Drawing Figures

TWO AXIS ANGULAR RATE AND SPECIFIC FORCE SENSOR UTILIZING VIBRATING ACCELEROMETERS

RELATED APPLICATIONS

The subject matter of the application is related to the co-pending patent applications Merhav Ser. No. 357,714 filed Mar. 12, 1982, now U.S. Pat. No. 4,445,376, Ser. No. 357,715 filed Mar. 12, 1982, now abandoned in favor of Ser. No. 538,776 filed Sept. 2, 1983 which are directed to apparatus and methods for inertially measuring the translational motion and angular rate of a moving body utilizing cyclically moving accelerometers.

TECHNICAL FIELD

The invention relates to apparatus for inertially determining the rate of angular rotation and translational motion of a structure utilizing vibrating accelerometers and in particular to such an apparatus using a pair of vibrating accelerometers for determining angular rate and translational motion along at least two axes.

BACKGROUND OF THE INVENTION

In the above cited patent application Ser. No. 357,714 and the article by Shmuel J. Merhav entitled "A Nongyroscopic Inertial Measurement Unit" published May 1981 by Technion Israel Institute of Technology, a method and apparatus for measuring the specific force vector and angular rate vector of a moving body by means of a plurality of cyclically driven accelerometers is disclosed. The co-pending patent application Ser. No. 357,715 and Ser. No. 528,776 cited above disclose similar techniques for measuring the specific force vector which provide a measure of translational motion and the angular rate vector of a moving body utilizing either a single or a pair of accelerometers vibrating at a constant frequency.

For certain applications such as low cost inertial reference systems, it is desirable to minimize the complexity and the number of sensor components used in such systems. In the three axis inertial reference systems described in the above cited patent applications, it is necessary to use either three or six accelerometers vibrating or moving in three separate axes. In the mechanical systems disclosed in the patent application Ser. No. 357,715 and Ser. No. 528,776 it is necessary to provide a mechanism for driving either one or two accelerometers along three separate orthogonal axes which can require a fairly complex and expensive mechanical drive system.

SUMMARY OF THE INVENTION

It is therefore an object of the invention to provide a two axis angular rate measuring system that includes two accelerometers with their force sensing axes aligned 90° to each other and vibrating along an axis normal to the force sensing axes. A triaxial angular rate and force sensor can be provided by combining two such sets of vibrating accelerometers where the axes of vibration are normal to each other.

It is another object of the invention to provide an angular rate measuring apparatus having first and second accelerometers vibrating along a vibration axis with the first accelerometer aligned such that it vibrates with its force sensing axis normal to the vibration axis and for aligning the second accelerometer in such a manner that it vibrates with its force sensing axis normal to both the vibration axis and the force sensing axis of the first accelerometer. This apparatus also includes a processor for generating a first rate signal from the output signal of the first accelerometer that represents angular rotation of the first accelerometer about the force sensing axis of the second accelerometer and also generates a second rate signal from the output signal of the second accelerometer representing the rotation of the second accelerometer about an axis parallel to the force sensing axis of the first accelerometer.

A further object of the invention is to provide an apparatus for measuring the translation of and angular rotation of a structure having first, second and third orthogonal axes that include first and second accelerometers each having force sensing axes; a first vibrating mechanism for vibrating the first and second accelerometers along the second axis; a first alignment mechanism for securing the first and second accelerometers to the first vibrating mechanism such that the force sensing axis of the first accelerometer is aligned with the first axis and the force sensing axis of the second accelerometer is aligned with the third axis; third and flourth accelerometers having force sensing axes; a second vibrating mechanism for vibrating the third and fourth accelerometers along the third axis; a second alignment mechanism for securing the third and fourth accelerometers such that the force sensing axis of the third accelerometer is aligned with the first axis and the fourth force sensing axis is aligned with the second axis; and a processor responsive to output signals from the accelerometers to generate rate signals representing the angular rotation of the structure about each of the first, second and third axes and for generating signals representing translation of the structure along each of the first, second and third axes.

DETAILED DESCRIPTION OF THE INVENTION

Figure 1:
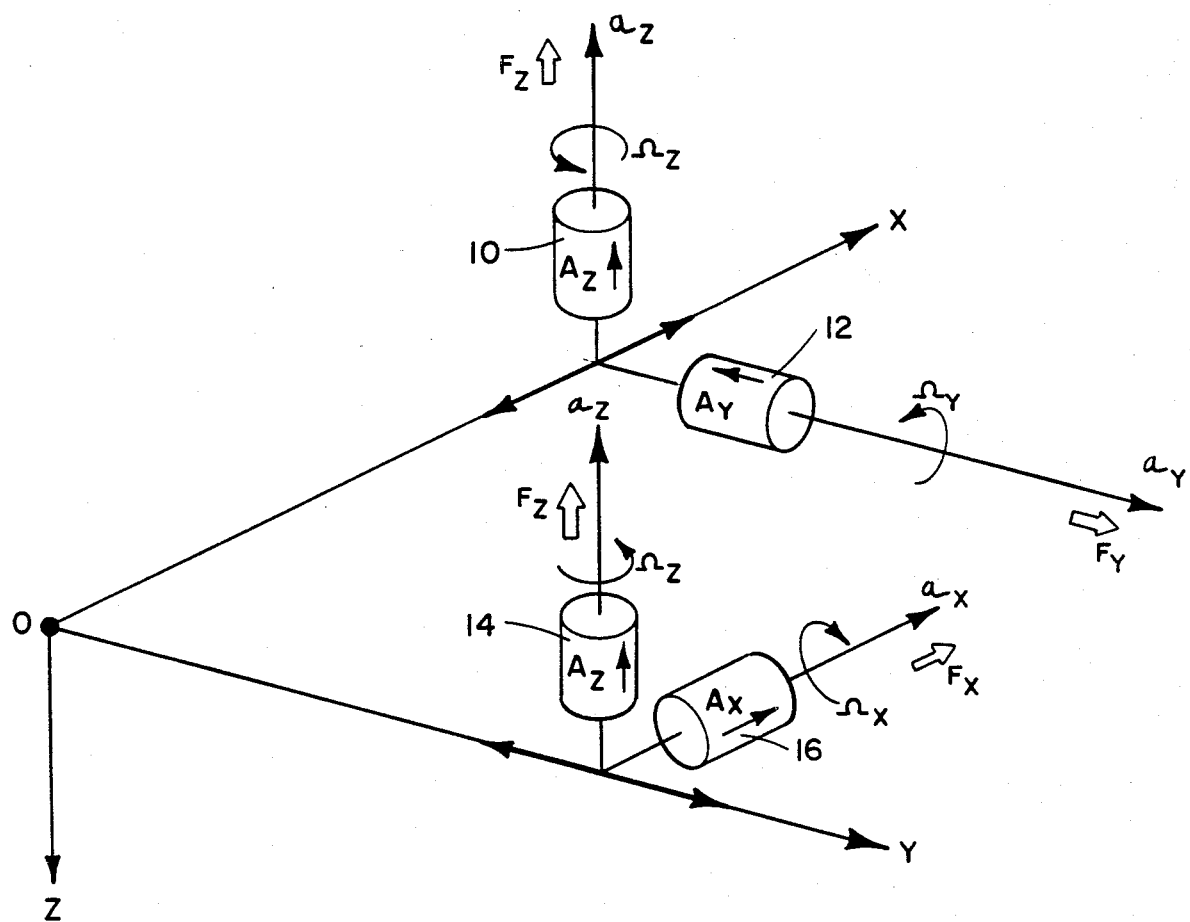
FIG. 1 is a diagram providing a conceptual illustration of a three axis rate and force sensor utilizing two sets of vibrating accelerometers.

In FIG. 1 shown in diagramatic form is an illustration of the invention wherein four accelerometers vibrating along two axes can be used to provide a three axis angular rate and force measuring system. For example, on the X axis two accelerometers 10 and 12 are caused to vibrate. The first accelerometer 10 has its force sensing axis $A_z$ aligned with the Z axis which is normal to the axis of vibration X. The second accelerometer 12 has its force sensing axis $A_y$ aligned with the Y axis which is normal to both the force sensing axis $A_z$ of accelerometer 10 and the axis of vibration X. The output signal $a_z$ of accelerometer 10 will include components representing both the translation of the frame of reference or structure designated by the axes X, Y and Z along the Z axis but will also include components representing the rotation of the structure about the axis Y as indicated by $\Omega_y$. In a similar manner, the output of accelerometer 12 as designated by $a_y$ will include components representing translation of the structure along the Y axis of the frame of reference of FIG. 1 as well as containing components resulting from coriolis force representing the rotation of the accelerometer 12 about the Z axis as designated by $\Omega_z$.

As can be seen from FIG. 1 and the discussion above, it is possible to utilize two accelerometers vibrating along a common axis to generate two angular rate signals and two force signals which represent the translation of the structure containing the accelerometers.

FIG. 1 also illustrates, by the addition of two additional accelerometers 14 and 16, that a three axis inertial sensing system can be constructed. As shown in FIG. 1, accelerometers 14 and 16 are vibrated along the Y axis with their force sensing axes $A_z$ and $A_x$ normal to the axis of vibration Y and rotated 90° from each other. Accelerometer 14 will produce another $a_z$ signal which as in the case of accelerometer 12 contains components representing the translation of the structure containing the accelerometers along the Z axis and rotation $\Omega_x$ about the X axis. Accelerometer 16, on the other hand, will complete the three axis inertial reference signal by outputing a signal $a_x$ that contains components representing the translation of the structure containing the accelerometers along the Z axis and angular rotation $\Omega_z$ about the Z axis.

Figure 2:
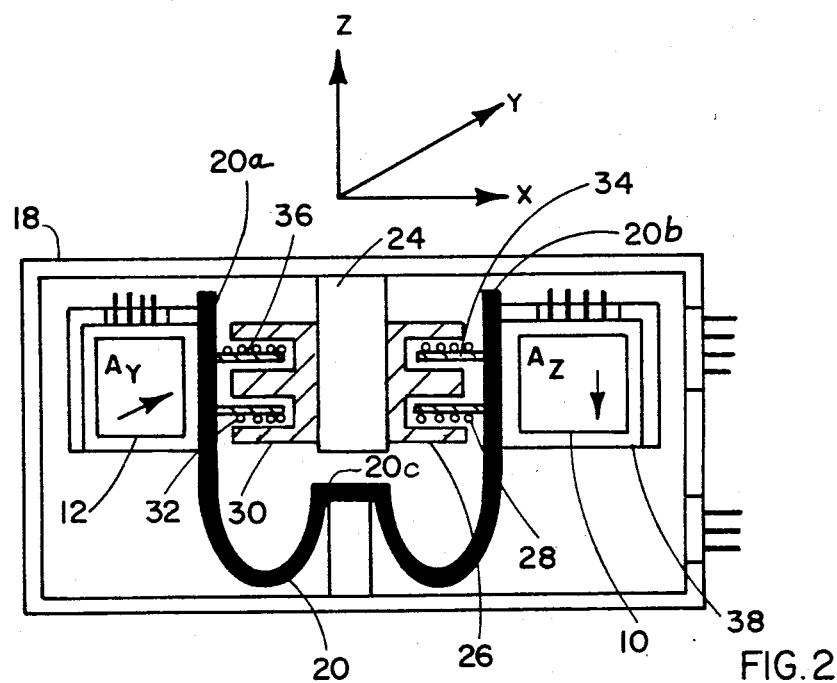
FIG. 2 is a sectioned view of a mechanism for vibrating two accelerometers along a single vibration axis.

An assembly for implementing the vibrating pairs of accelerometers as shown in FIG. 1 is provided in FIG. 2. The tuning fork assembly of FIG. 2 can be used to vibrate each pair of accelerometers as shown in FIG. 1. Included in the vibrating accelerometer assembly is an outer cylindrical housing 18 in which is mounted a tuning fork 20 having a pair of prongs 20a and 20b. Prongs 20a and 20b extend parallel to the Z axis of FIG. 1 and as a result are perpendicular to the axis of vibration X. The tuning fork 20 is mounted within the housing 18 by means of a mounting post 22 secured to an intermediate web 20c of the tuning fork. This general arrangement for vibrating a pair of accelerometers is described in the above cited patent applications Ser. No. 357,715 and Ser. No. 528,776.

The housing 18 further includes another post 24 aligned with the post 22 but spaced from it and also from web 20c of the tuning fork 20. Post 24 is used for mounting on one side a permanent magnet 26 that cooperates with a drive coil 28, and on the other side a permanent magnet 30 that cooperates with a pick-off coil 32. The two permanent magnets 26 and 30 are of cylindrical configuration and include cylindrical air gaps within which are exposed their respective drive coils 28 and 32, each of which is carried on a pair of cylindrical bobbins 34 and 36 respectively that in turn are secured to the inner faces of the two prongs 20b and 20a.

To the outer face of the prong 20b of the tuning fork 20 secured by means of a mounting 38 is accelerometer 10 of FIG. 1 having the force sensing axis $A_z$ orientated as shown. In a similar manner, the other accelerometer 12 is secured to the outer face of the prong 20a of the tuning fork 20 with the accelerometer force sensing axis $A_y$ orientated as shown, that is perpendicular to the direction of tuning fork movement and the force sensing axis $A_z$ of accelerometer 10.

It will be appreciated from the illustration in FIG. 2 that the tuning fork 20 when vibrating at its natural frequency will cause the accelerometers 10 and 12 to move in synchronism but in opposite directions. As a result, no net force will be exerted on the housing 18 nor to the support structure (not shown) to which the vibrating accelerometer assembly contained in housing 18 is attached. The accelerometer support structure which is symbolically represented in FIG. 1 by the X, Y and Z axes would be the moving body itself in a strap-down inertial reference system or the inner gimble of a platform in a stable gimbled platform application.

Figure 3:
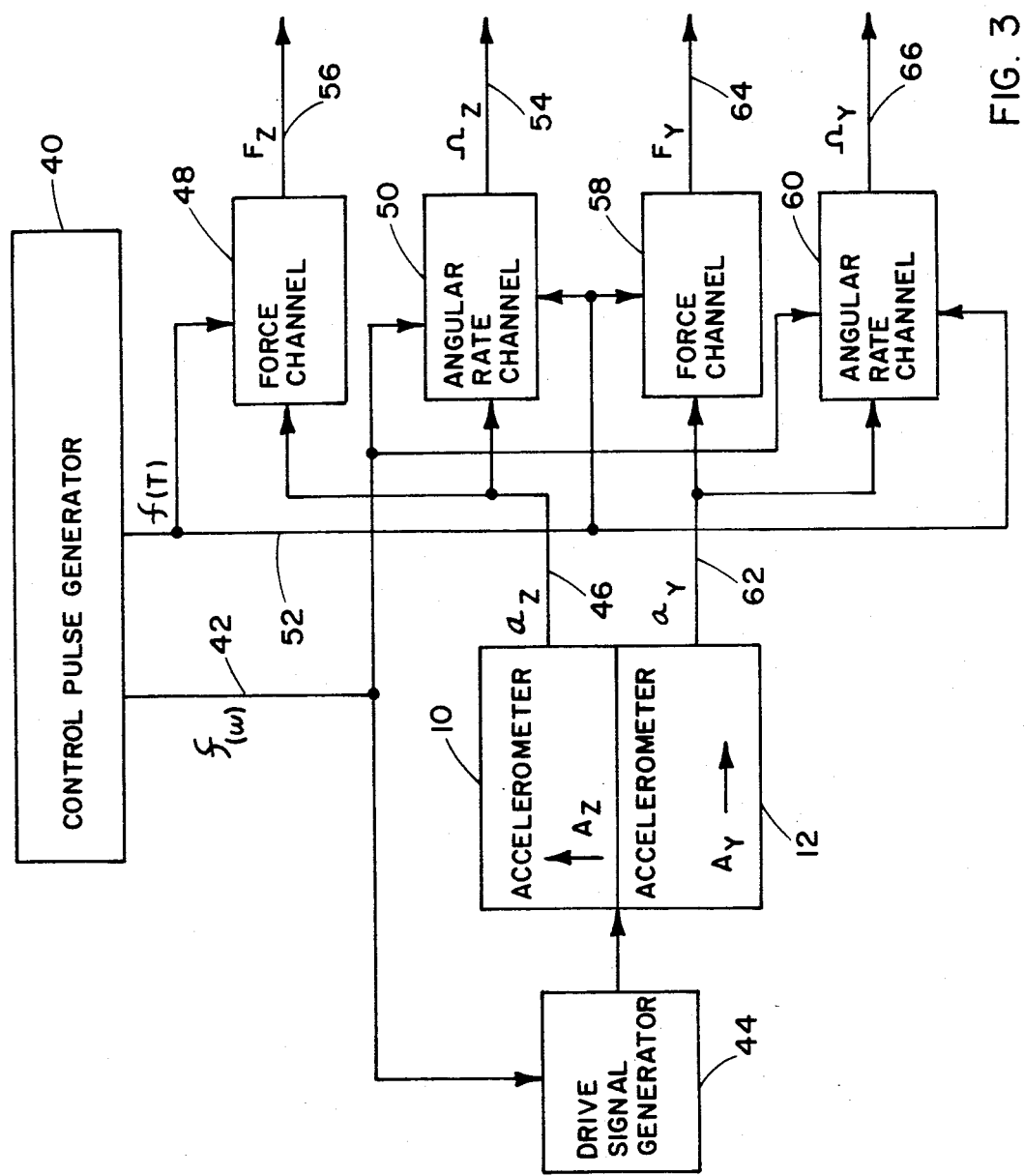
FIG. 3 is a block diagram of a processor circuit for converting accelerometer signals into angular rate and force signals.

An example of a processing circuit for separating the force from the rate signals for a pair of vibrating accelerometers such as accelerometers 10 and 12 of FIGS. 1 and 2 is illustrated in block diagram form in FIG. 3. The principles of signal separation by which the circuit of FIG. 3 operates are the same as are disclosed in detail in the previously cited patent applications Ser. No. 357,714, Ser. No. 528,776 as well as the article by Shmuel J. Merhav entitled "A Nongyroscopic Inertial Measurement Unit" published May 1981 by Technion Israel Institute of Technology. As shown in FIG. 3, a control pulse generator generates a series of pulses on a line 42 that is a function of the angular frequency at which the accelerometers 10 and 12 are vibrating. The pulse signals at line 42 then are applied to a drive signal generator 44 which may be used to cause a drive mechanism such as the tuning fork 20 of FIG. 2 to vibrate the accelerometers 10 and 12 through a small angle at the frequency.

The output signal $a_z$ from accelerometer 10 then is applied over a line 46 to a force channel 48 and an angular rate channel 50. The angular rate channel circuit 50 then derives the rate signal $\Omega_y$ by applying the zero mean periodic function signal $\mathrm{sgn}c\omega t$ to the $a_z$ signal and integrating the result over the time period T which represents one cycle of the frequency $\omega$. The control pulse generator 40 provides a pulse signal that is a function of the time period T on a line 52 which is input to the angular rate channel 50 as well as to force channel 48. The force channel 48 operates by integrating the $a_z$ signal over the time period T to produce on output line 56 the signal $F_z$ that represents the translation of the structure containing accelerometers 10 and 12 along the Z axis as shown in FIG. 1.

Also included in the circuit of FIG. 3 is a force channel 58 and an angular rate channel 60 that operate in the same manner on the $a_y$ output signal of accelerometer 12 as transmitted on a line 62 to produce the force signal $F_y$ on an output line 64 and the rate signal $\Omega_z$ on an output line 66.

I claim:

1. An angular rate measuring apparatus comprising:
   a first accelerometer having a first force sensing axis;
   a second accelerometer having a second force sensing axis;
   vibrating means for vibrating said first and second accelerometers along a vibration axis;
   alignment means for securing said first accelerometer to said vibrating means such that said first force sensing axis is normal to said vibration axis and for securing said second accelerometer to said vibrating means such that said second force sensing axis is normal to both said vibration axis and said first force sensing axis; and
   processing means operatively connected to said first and second accelerometers for generating a first rate signal from the output signal of said first accelerometer representing the angular rotation of said first accelerometer about a first axis parallel to said second accelerometer force sensing axis and for generating a second rate signal from the output signal of said second accelerometer representing the rotation of said second accelerometer about a second axis parallel to said first accelerometer force sensing axis.

2. The apparatus of claim 1 wherein said processing means additionally includes means for generating a first force signal from the output signal of said first accelerometer representing the change of velocity of said first and second accelerometers along said first force sensing axis and for generating a second force signal from the output signal of said second accelerometer representing the change in velocity of said first and second accelerometers along said second force sensing axis.

3. The apparatus of claim 2 wherein said vibration means vibrates said first and second accelerometers at constant frequency in opposite directions on said vibration axis.

4. An apparatus for measuring the translation of and angular rotation of a structure having first, second and third orthogonal axes comprising:
- a first accelerometer having a first force sensing axis;
- a second accelerometer having a second force sensing axis;
- first vibrating means for vibrating said first and said second accelerometers along the second axis;
- first alignment means for securing said first and said second accelerometers to said first vibrating means such that said first force sensing axis is aligned with the first axis and said second force sensing axis is aligned with the third axis;
- a third accelerometer having a third force sensing axis;
- a fourth accelerometer having a fourth force sensing axis;
- second vibrating means for vibrating said third and fourth accelerometers along the third axis;
- second alignment means for securing said third and said fourth accelerometers to said second vibrating means such that said third force sensing axis is aligned with the first axis and said fourth force sensing axis is aligned with the second axis; and
- processing means operatively connected to said first, second, third and fourth accelerometers for generating rate signals representing the angular rotation of the structure about each of the first, second and third axes and for generating force signals representing translation of the structure along each of the first, second and third axes.

5. The apparatus of claim 4 wherein said processing means includes means for converting the output signal of said first accelerometer into first rate signal representing the angular rate of the structure about the third axis; means for converting the output signal of said second accelerometer into a second rate signal that represents the angular rotation of the structure about the first axis and means for converting the output signal of said third accelerometer into a third rate signal that represents the angular rotation of the structure about the second axis.

6. The apparatus of claim 5 wherein said processing means additionally includes means for converting the output of said fourth accelerometer into a fourth rate signal that represents the angular rate of rotation of the structure about the first axis.

7. The apparatus of claim 5 wherein said processor means additionally includes means responsive to the first accelerometer output signal to generate a first force signal representing translation of the structure along the first axis, means responsive to the second accelerometer output signal to generate a second force signal representing translation of the structure along the third axis; means responsive to the third accelerometer output signal for generating a third force signal representing translation of the structure along the first axis; and means responsive to the fourth accelerometer output signal for generating a fourth force signal representing the translation of the structure along the second axis.

* * * * *